United States Patent
Lee et al.

(10) Patent No.: US 9,640,286 B2
(45) Date of Patent: May 2, 2017

(54) PASSIVE COOLING APPARATUS OF SPENT FUEL POOL

(75) Inventors: Sang Jong Lee, Daejeon (KR); Geol Woo Lee, Daejeon (KR); Young Baek Kim, Daejeon (KR); Jae Don Choi, Daejeon (KR); Jae Il Lee, Daejeon (KR); Sung Ju Cho, Daejeon (KR); Jung Seon An, Daejeon (KR); Dong Kyu Lee, Daejeon (KR); Hye Jin Kim, Daejeon (KR); Dong Uk Choi, Daejeon (KR)

(73) Assignee: KEPCO NUCLEAR FUEL CO., LTD., Daejeon (KR)

( * ) Notice: Subject to any disclaimer, the term of this patent is extended or adjusted under 35 U.S.C. 154(b) by 958 days.

(21) Appl. No.: 13/593,115

(22) Filed: Aug. 23, 2012

(65) Prior Publication Data

US 2013/0108004 A1    May 2, 2013

(30) Foreign Application Priority Data

Sep. 8, 2011    (KR) .......................... 10-2011-0091156

(51) Int. Cl.
  *G21C 19/07*    (2006.01)
  *G21C 15/18*    (2006.01)
  (Continued)

(52) U.S. Cl.
  CPC .............. *G21C 19/07* (2013.01); *G21C 15/18* (2013.01); *G21C 15/24* (2013.01); *G21D 1/04* (2013.01); *G21D 3/04* (2013.01); *Y02E 30/40* (2013.01)

(58) Field of Classification Search
  CPC ........ G21C 15/18; G21C 9/004; G21C 19/07; Y02E 30/40; G21F 5/10
  (Continued)

(56) References Cited

U.S. PATENT DOCUMENTS 3,141,324 A * 7/1964 Boies et al. ................. 73/61.62
4,404,165 A * 9/1983 Hesky ..................... G21C 15/18
                                                          250/506.1

(Continued)

FOREIGN PATENT DOCUMENTS

CN    101441902 A    5/2009
CN    201318821 Y    9/2009
(Continued)

OTHER PUBLICATIONS

Simmons et al (A comprehensive nuclear plant and radiological release consequence projection system; paper submitted to ANS Topical Meeting on Emergency Preparedness and Response; Mar. 2008; Section III Figure 3).*

(Continued)

*Primary Examiner* — Jack W Keith
*Assistant Examiner* — Sharon M Davis
(74) *Attorney, Agent, or Firm* — Rabin & Berdo, P.C.

(57) ABSTRACT

An apparatus for cooling a spent fuel pool having a heat exchanger includes a cooling water pool positioned above the spent fuel pool; a floating device configured to be elevated according to a water level of a cooling water in the spent fuel pool; and an emergency cooling water supply pipe configured to form a path through which the cooling water of the cooling water pool is moved to the spent fuel pool and configured to include a floating valve that opens or closes a flow passage of the cooling water in connection with the elevation of the floating device.

5 Claims, 6 Drawing Sheets

(51) Int. Cl.
*G21D 1/04* (2006.01)
*G21D 3/04* (2006.01)
*G21C 15/24* (2006.01)

(58) Field of Classification Search
USPC ............... 376/299, 283, 298, 293, 272, 282
See application file for complete search history.

(56) References Cited

U.S. PATENT DOCUMENTS

| | | | | |
|---|---|---|---|---|
| 4,753,771 | A | * | 6/1988 | Conway .................. G21C 15/18 376/282 |
| 4,950,448 | A | * | 8/1990 | Gou ........................ G21C 15/18 376/283 |
| 5,096,659 | A | * | 3/1992 | Hidaka et al. ................. 376/283 |
| 5,102,616 | A | * | 4/1992 | Gardner .................. G21C 1/322 376/282 |
| 5,268,942 | A | * | 12/1993 | Newton ............... G21C 15/182 376/272 |
| 5,488,642 | A | * | 1/1996 | Malik et al. ................... 376/272 |

FOREIGN PATENT DOCUMENTS

| | | |
|---|---|---|
| CN | 201383354 Y | 1/2010 |
| CN | 201574774 U | 9/2010 |
| CN | 201729719 U | 2/2011 |
| JP | 54-148994 A | 11/1979 |
| JP | 56-158993 A | 12/1981 |
| JP | 60-138498 A | 7/1985 |
| JP | 60-222797 A | 11/1985 |
| JP | 61-70496 A | 4/1986 |
| JP | 64-054399 A | 3/1989 |
| JP | 03-041395 A | 2/1991 |
| JP | 05-142380 A | 6/1993 |
| JP | 06-130169 A | 5/1994 |
| JP | 06-265673 A | 9/1994 |
| JP | 6-294891 A | 10/1994 |
| JP | 2003-167089 A | 6/2003 |
| JP | 2005-156198 A | 6/2005 |
| JP | 2005-181238 A | 7/2005 |

OTHER PUBLICATIONS

Ibarra et al., "Assessment of Spent Fuel Cooling" NUREG 1275, vol. 12, Feb. 1997.*

"AP1000 Spent Fuel Cooling System Simulation", Automation Panorama, Feb. 2010, pp. 65-69.

* cited by examiner

PASSIVE COOLING APPARATUS OF SPENT FUEL POOL

CROSS-REFERENCE TO RELATED APPLICATIONS

The present application claims priority benefits under 35 U.S.C. §119 to Korean Patent Application No. 10-2011-0091156, filed Sep. 8, 2011.

BACKGROUND OF THE INVENTION

1. Field of the Invention

The present invention relates to an apparatus for providing a cooling water to a spent fuel pool, and more particularly to a passive cooling apparatus of a spent fuel pool in which, when a power is disconnected to a pump for supplying the cooling water due to an accident and thus the spent fuel pool's cooling capacity is disrupted to deplete the cooling water, the cooling water is supplied to the spent fuel pool, without a separate power supply, according to a water level of the cooling water in the spent fuel pool, thereby preventing or delaying a damage to the spent fuel pool.

2. Description of the Related Art

When storing nuclear fuel, especially in case of storing a spent nuclear fuel prior to final disposal, it is essential to store the nuclear fuel in a manner such that a criticality safety is maintained, decay heat is removed, radioactive materials are sealed, and human beings and the environment are sufficiently protected from radiation.

A wet storage method in which spent nuclear fuel is stored in a storage tank has been widely operated in various countries up to the current time, and is a well established technology for storing the spent fuel.

Generally, an aggregate of the spent fuel is stored in a storage rack within the storage tank composed of concrete materials, and the storage tank is usually lined with stainless steel or epoxy paint.

Typically, in a conventional method of cooling a spent fuel storage tank, radioactive decay heat generated in the spent fuel is removed by forced cooling using a heat exchanger and a temperature of cladding is maintained at 30~40° C. during an operation, and therefore, it is advantageous in that a storage density is higher than in case of a dry storage method. However, the conventional forced cooling method using the heat exchanger has a serious problem such that, when a power supply is stopped due to an accident, a cooling function becomes disabled and the nuclear fuel is exposed by depletion of the cooling water.

In addition, with respect to the storage of the spent fuel, U.S. Pat. No. 5,488,642, titled "COOLING SYSTEM FOR SPENT FUEL," published on Jan. 30, 1996 discloses a cooling system of the spent fuel pool; however, this system requires an operation of, for example, a heat exchanger or a pump, and thus, a supply of electric power is still required. Thus, this system fails to teach a cooling apparatus according to the present invention for supplying a cooling water without power supply in the event of an emergency situation where the power supply is disrupted.

SUMMARY OF THE INVENTION

Accordingly, the present invention has been made keeping in mind the above mentioned problems occurring in the related art, and an object of the present invention is to provide a cooling apparatus of a spent fuel pool in which, when a power supply is stopped and a heat exchanger for cooling the spent fuel pool is disabled, a cooling water is supplied to the spent fuel pool, without a separate power supply, thereby delaying or preventing a leakage of a radioactive material due to a damage to a coating material of a nuclear fuel caused by depletion of the cooling water.

Also, another object of the present invention is to provide a multipurpose cooling apparatus of a spent fuel pool, which can perform a cooling function for the spent fuel pool in a normal state in which power supply is functional, and can provide a cooling water to the spent fuel pool without requiring separate power when the power supply is interrupted.

According to an aspect of the present invention, provided is an apparatus for cooling a spent fuel pool having a heat exchanger, the apparatus comprising: a cooling water pool positioned above the spent fuel pool; a floating device configured to be elevated according to a water level of a cooling water in the spent fuel pool; and an emergency cooling water supply pipe configured to form a path through which the cooling water of the cooling water pool is moved to the spent fuel pool and configured to include a floating valve that opens or closes a flow passage of the cooling water in connection with the elevation of the floating device.

According to another aspect of the present invention, provided is an apparatus for cooling a spent fuel pool, the apparatus comprising: the spent fuel pool; a cooling water pool positioned above the spent fuel pool and having a heat exchanger; a cooling water recovery pipe configured to recover a cooling water of the spent fuel pool into the cooling water pool and having a cooling water circulation pump; and a cooling water supply pipe configured to move a cooling water of the cooling water pool to the spent fuel pool.

In one embodiment, the apparatus for cooling a spent fuel pool can further comprises a floating device configured to be elevated according to a water level of the cooling water of the spent fuel pool; and an emergency cooling water supply pipe configured to include a floating valve that opens or closes a flow passage of the cooling water in connection with the elevation of the floating device.

In one embodiment, the apparatus for cooling a spent fuel pool may further comprise a movable cooling water circulation pipe including a movable pump for connecting the cooling water recovery pipe with the cooling water supply pipe, a movable heat exchanger, and valves.

In one embodiment, the apparatus for cooling a spent fuel pool may further comprise an emergency cooling water circulation pipe configured to circulate the cooling water of the spent fuel pool and the cooling of the cooling water pool.

In one embodiment, the cooling water pool may comprise an air cooling pipe.

In one embodiment, the cooling water pool may comprise a cooling water supplementing pipe.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE INVENTION

Hereinafter, an exemplary embodiment of the present invention will be described in detail with reference to the attached drawings.

Exemplary embodiments of the present invention will be described herein below with reference to the accompanying drawings. Throughout the drawings, like reference numbers are used to identify like elements. Also, in the following description, well-known functions or constructions are not described in detail since they would obscure the invention in unnecessary detail.

Figure 1:
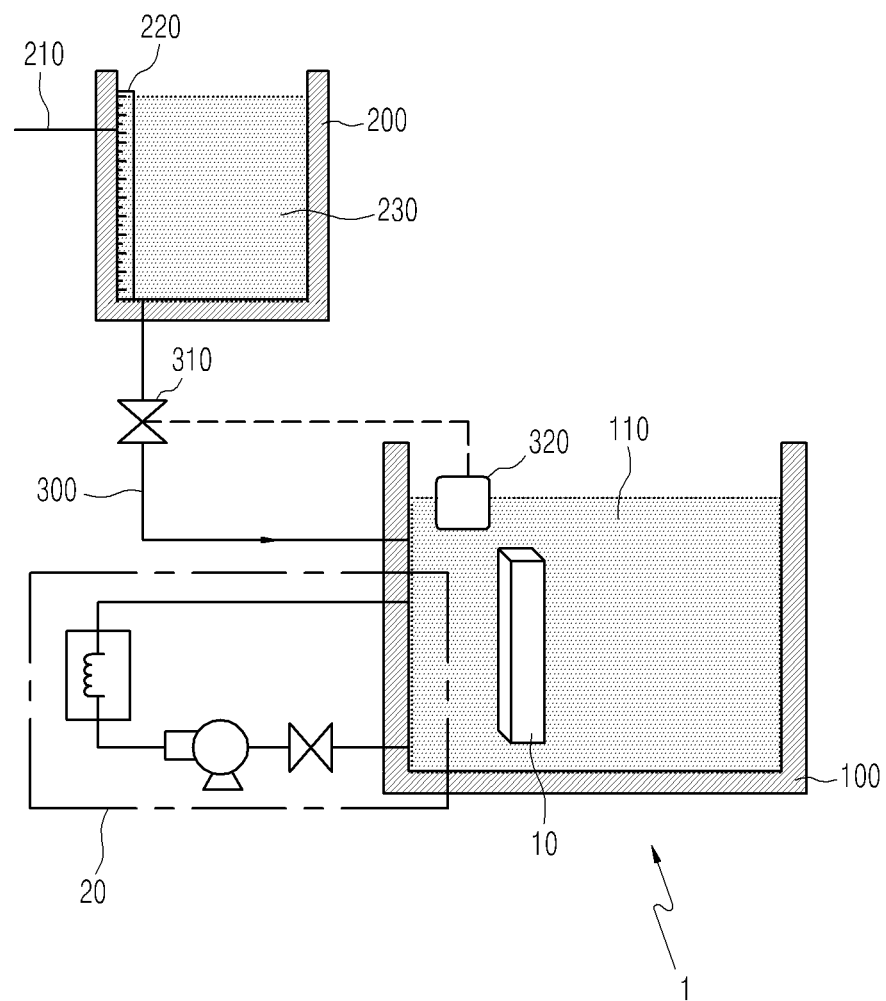
FIG. 1 is a configuration view illustrating a detailed configuration of a cooling apparatus 1 of a spent fuel pool.
Figure 2:
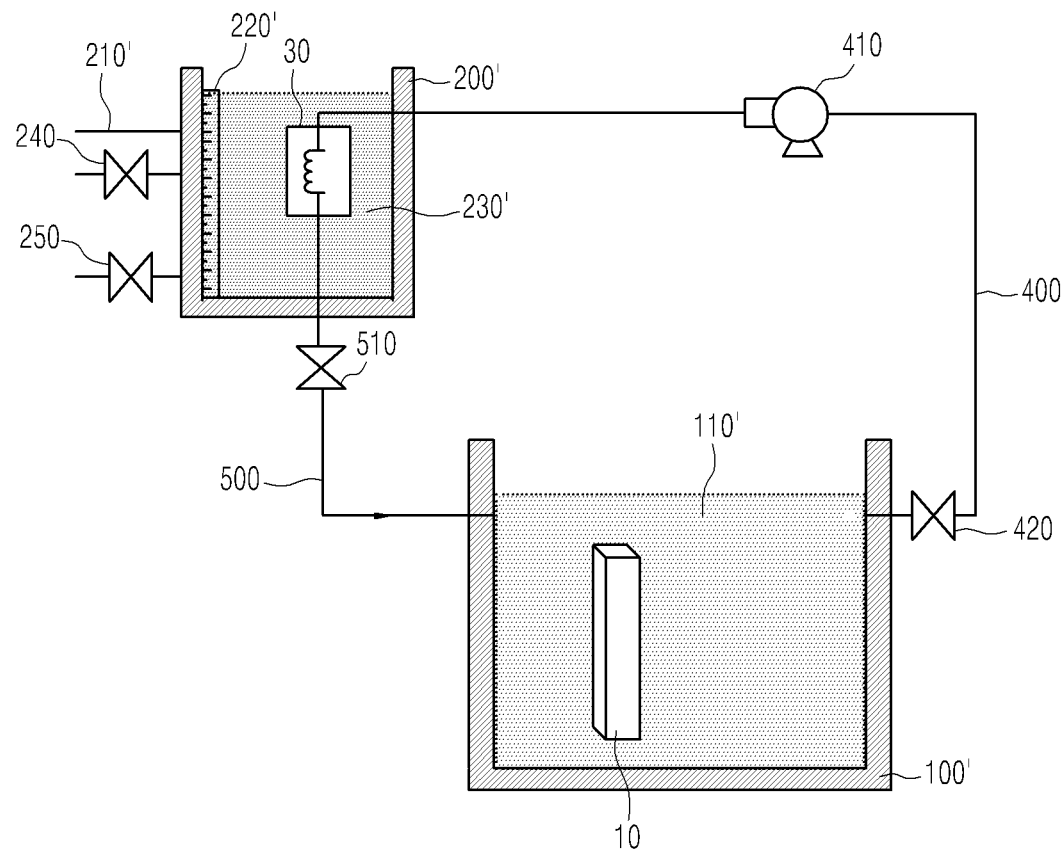
FIG. 2 is a configuration view illustrating a cooling water pool, a cooling water recovery pipe, and a cooling water supply pipe that replaces a function of a heat exchanger provided in a conventional spent fuel pool.
Figure 3:
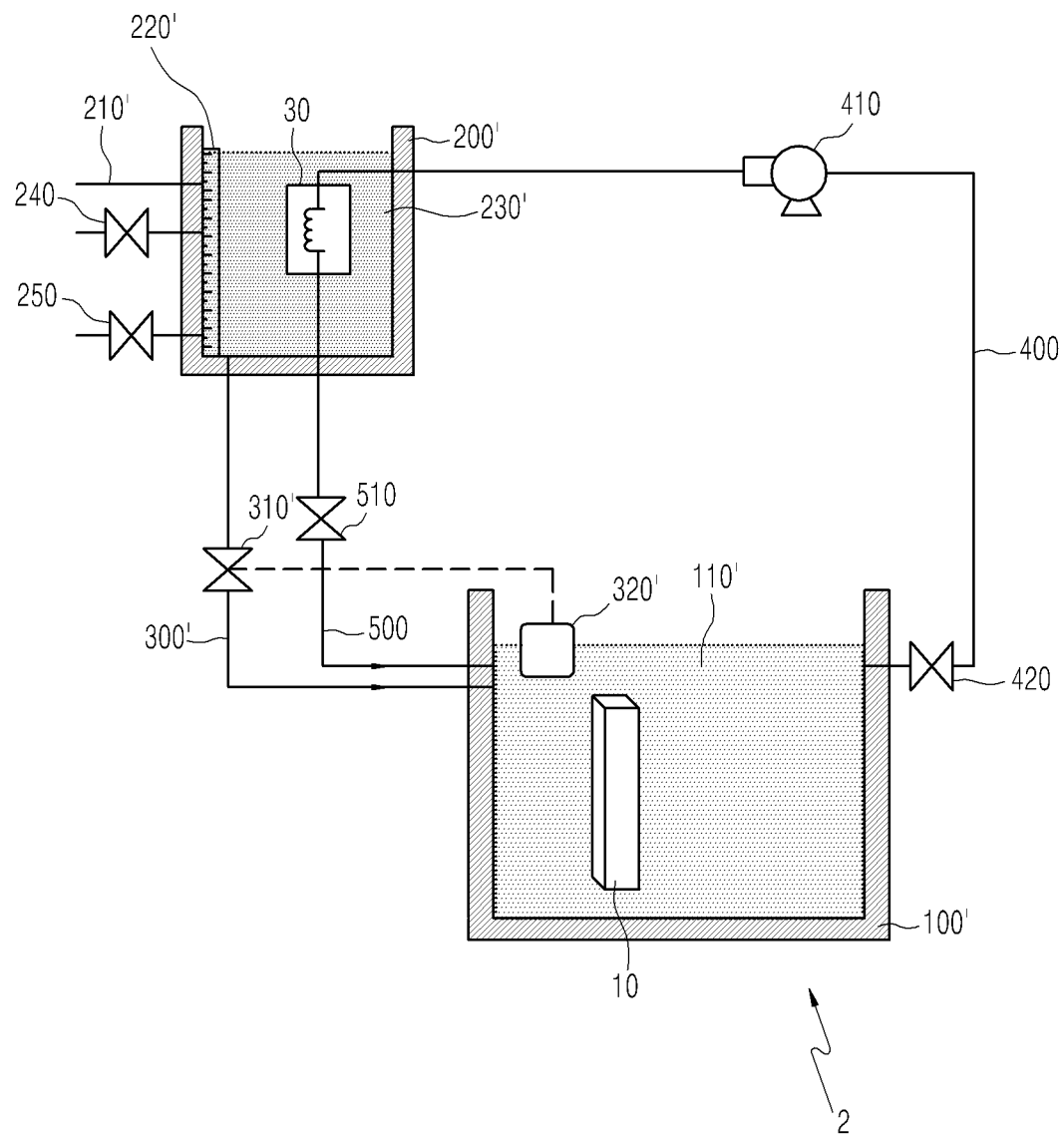
FIG. 3 is a configuration view illustrating a detailed configuration of a cooling apparatus 2 of a spent fuel pool according to another exemplary embodiment of the present invention.

As shown in FIGS. 1 through 3, spent fuel cooling apparatuses 1 and 2 according to the present invention includes spent fuel pools 100 and 100', cooling water pools 200 and 200', emergency cooling water supply pipes 300 and 300', which are respectively equipped with floating valves 310 and 310' that open or close in connection with floating devices 320 and 320', a cooling water recovery pipe 400, which is equipped with a cooling water circulation pump 410, and a cooling water supply pipe 500.

As shown in FIG. 1 in detail, in the cooling apparatus 1 of the spent fuel pool according to the present invention, the cooling water pool 200 is positioned above the spent fuel pool 100, which is equipped with a heat exchanger 20. In addition, the floating device 320, which is elevated according to a water level of the cooling water filled within the spent fuel pool 100, is provided and the emergency cooling water supply pipe 300, which is equipped with the floating valve 310 that opens or closes in connection with the floating device 320, is included.

In a normal state, i.e., when a power supply is functional, a cooling function of the spent fuel pool 100 using the heat exchanger 20 according to a forced cooling method is maintained. However, when an accident occurs such that the power supply is stopped and an operator can not take an additional measure, the cooling function of the spent fuel pool 100 using the heat exchanger 20 is stopped, and a temperature of the cooling water stored in the spent fuel pool 100 is increased due to decay heat generated in the spent fuel 10 stored in the spent fuel pool 100. Eventually the cooling water becomes depleted. In this case, when the water level of the cooling water filled in the spent fuel pool 100 is lowered below a certain level, the floating device 320 descends according to the water level of the cooling water, and the floating valve 310, which is mounted on the emergency cooling water supply pipe 300 to be associated with the floating device 320, is opened such that the cooling water stored in the cooling water pool 200 is supplied to the spent fuel pool 100 by a gravity force. Therefore, even when there exists no power supply and no further action by the operator, the cooling water can be supplied to the spent fuel pool 100 during a certain period of time, thereby preventing damage to cladding of the spent fuel 10 due to depletion of the cooling water.

In addition, as shown in FIGS. 2 and 3 in detail, according to another embodiment of the present invention, in the spent fuel cooling apparatus 2, the spent fuel pool 200' equipped with the heat exchanger 30 is located lower than the spent fuel pool 100'. The spent fuel pool 100' and the spent fuel pool 200', which is equipped with the heat exchanger 30, are connected to the cooling water recovery pipe 400, which includes a cooling water circulation pump 410 mounted thereon, and the cooling water supply pipe 500. Meanwhile, the floating device 320', which is elevated according to the water level of the cooling water filled in the spent fuel pool 100', can be provided and the emergency cooling water supply pipe 300', which is equipped with the floating valve 310' that opens or closes in connection with the floating device 320', can be included.

In a normal state in which a cooling function is functionally operated for storing the spent fuel 10, i.e., when a power supply is effective to perform a cooling function, a valve 420 provided on the cooling water circulation pipe 400 is opened and the cooling water circulation pump 410 mounted on the cooling water recovery pipe 400 is operated such that the cooling water of which temperature is raised in the spent fuel pool 100' is moved to the cooling water pool 200' that includes the heat exchanger 30 to lower the temperature of the cooling water, and the cooling water is supplied to the spent fuel pool 100' when the valve 510 equipped on the cooling water supply pipe 500 is opened. Also, the heat exchanger 30 is provided in the cooling water pool 200' so that, when the temperature of the cooling water is raised or the water level of the cooling water pool 200' is lowered due to the supply of the cooling water, a cooling water at a lower temperature is circulated through valves 240, 250 equipped on the cooling water pool 200' so that the temperature of the cooling water stored in the cooling water pool 200' can be lowered as well as supplementing the spent cooling water.

On the other hand, when an accident occurs such that the power supply is stopped and an operator cannot take an additional measure, the cooling function of the spent fuel pool 200' equipped with the heat exchanger 30 is stopped, and a temperature of the cooling water filled in the spent fuel pool 100 is increased due to the decay heat generated in the spent fuel 10 stored in the spent fuel pool 100' and eventually the cooling water becomes depleted. In this case, when the water level of the cooling water filled in the spent fuel pool 100' is lowered below a certain level, the floating device 320' descends according to the water level of the cooling water, and the floating valve 310', which is mounted on the emergency cooling water supply pipe 300' to be associated with the floating device 320', is opened such that the cooling water stored in the cooling water pool 200' is supplied to the spent fuel pool 100' by a gravity force. Therefore, even when there is no power supply and no further action by the operator, the cooling water can be supplied to the spent fuel pool 100' during a certain period of time, thereby preventing damage to a coating material of the spent fuel 10 due to depletion of the cooling water.

Figure 4:
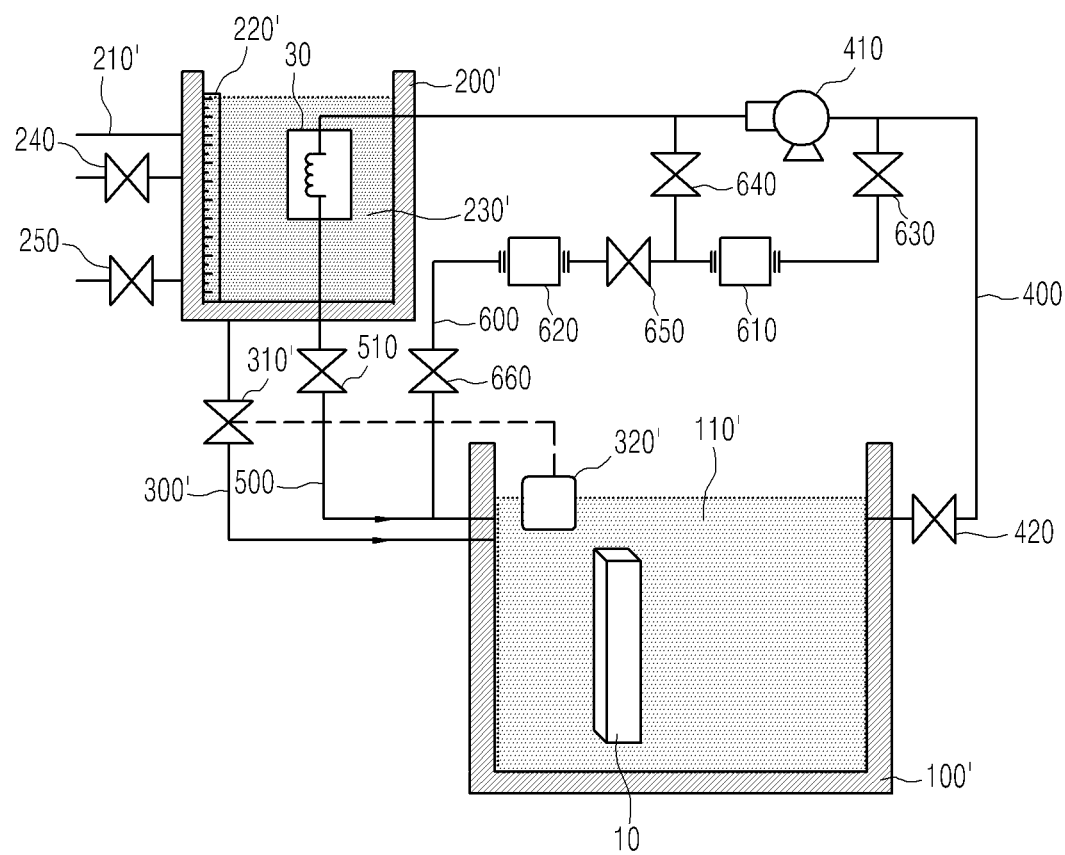
FIG. 4 is a configuration view illustrating the cooling apparatus 2 of the spent fuel pool equipped with a movable cooling water circulation pipe according to another exemplary embodiment of the present invention.

In addition, as shown in FIG. 4 in detail, the spent fuel cooling apparatus 2 according to another embodiment of the present invention can include a movable cooling water circulation pipe 600 that connects the cooling water recovery pipe 400 and the cooling water supply pipe 500.

When the heat exchanger 30 or the cooling water circulation pump 410 cannot function due to a power failure caused by an accident but can be accessible by the operator, the movable cooling water circulation pipe 600, which is equipped with a movable pump 610 for connecting the cooling water recovery pipe 400 and the cooling water supply pipe 500, a movable heat exchanger 620, and valves 630, 640, 650, and 660 can be installed. When the function of the heat exchanger 30 is maintained but the cooling water circulation pump 410 does not function, the valve 640 in FIG. 4 is closed and the valves 630, 650 and 660 are opened. Next, both the movable pump 610 and the movable heat exchanger 620 are operated to perform a normal cooling function.

Figure 5:
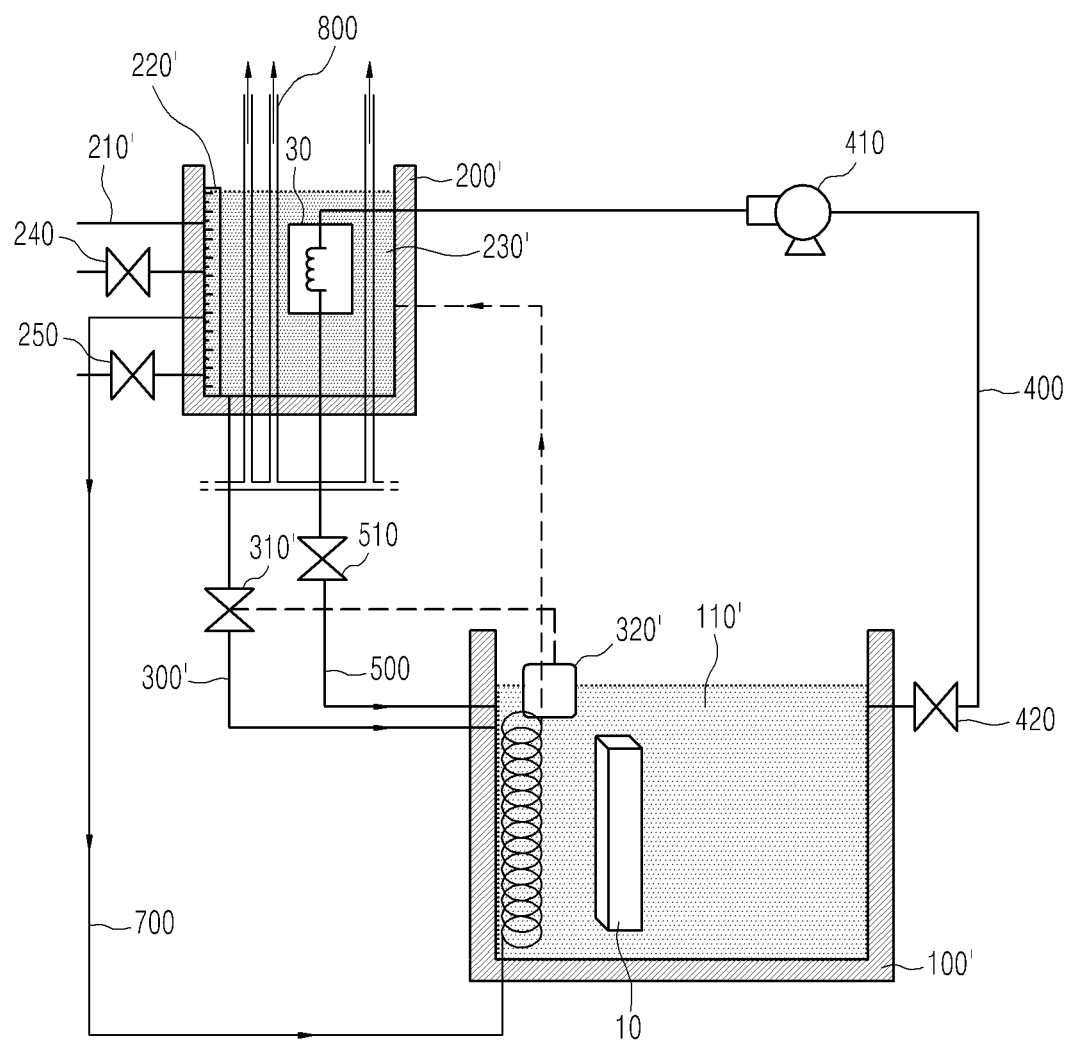
FIG. 5 is a configuration view illustrating the cooling apparatus 2 of the spent fuel pool equipped with an emergency cooling water circulation pipe and an air cooling pipe according to another exemplary embodiment of the present invention.
Figure 6:
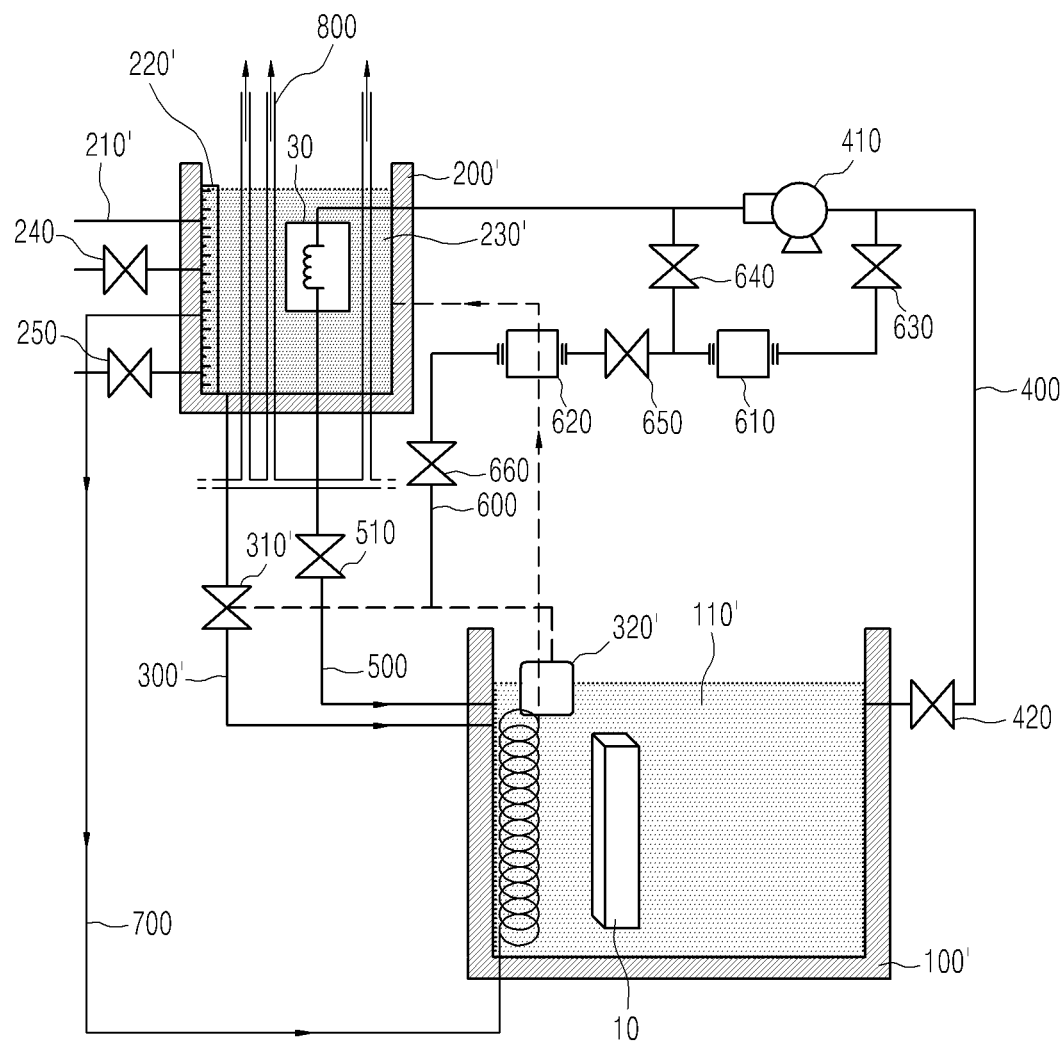
FIG. 6 is a configuration view illustrating the cooling apparatus 2 of the spent fuel pool equipped with a movable cooling water circulation pipe, an emergency cooling water circulation pipe, and an air cooling pipe according to another exemplary embodiment of the present invention.

In addition, as shown in FIG. 5 in detail, the spent fuel cooling apparatus 2 according to another embodiment of the present invention can include an emergency cooling water circulation pipe 700 or an air cooling pipe 800.

When the cooling function is normally performed due to a smooth power supply, the temperature of the cooling water 110' stored in the spent fuel pool 100' is maintained lower, and therefore, the circulation of the cooling water through the emergency cooling water circulation pipe 700 does not occur. However, when an accident occurs such as a power failure occurs, the cooling apparatus cannot function normally and the temperature of the cooling water 110' stored in the spent fuel pool 100' is increased to heat the emergency cooling water circulation pipe 700, thereby generating a natural convection. Therefore, by circulating the lower-temperature cooling water 230', which has been supplied to the cooling water pool 200', through the emergency cooling water circulation pipe 700, a temperature rise of the cooling water 110' stored in the spent fuel pool 100' can be prevented or delayed. Meanwhile, in order to provide a maximum heat transfer area, a portion of the emergency cooling water circulation pipe 700 that is included in the spent fuel pool 100' can be formed in a spiral structure.

Meanwhile, the cooling water pool 200' can include one or more air cooling pipe 800. The air cooling pipe 800 is used to air cool the cooling water 230' stored in the cooling water pool 200'. When an air inside the air cooling pipe 800 is heated and rises, an internal pressure therein is decreased and a cool air from outside is introduced to a lower portion of the air cooling pipe 800. The air cooling pipes 800 are connected to each other at a bottom portion, and when an emergency power or portable power is available, a fan is operated to increase an air cooling effect and a cooling pin can be mounted on the air cooling pipe 800 to maximize a cooling efficiency.

In addition, the cooling water pool 200, 200' can be equipped with cooling water supplementing pipes 210, 210' for supplementing a depleted cooling water and cooling water level gauges 220, 220' for identifying the cooling water 230, 230' that is remaining in the cooling water pools 200, 200'. The cooling water supplementing pipes 210, 210' are connected to an outside of a nuclear reactor so that, when the cooling water stored in the cooling water pools 200, 200' is supplied to the spent fuel pool 100, 100' through the emergency cooling water supply pipe 300, 300' due to an accident such as power failure and is thus depleted, the cooling water can be supplied to the cooling water pool 200, 200' in a convenient and safe way through the cooling water supplementing pipe 210, 210' that is connected to the external of the nuclear reactor, thus obviating the need for an individual to enter into the nuclear reactor in which the accident occurs. Meanwhile, when the operator can access the spent fuel pool 100, 100', the cooling water 230, 230' that is remaining in the cooling water pools 200, 200' is identified through the cooling water level gauge equipped within the cooling water pools 200, 200', thereby being capable of supplying the cooling water to the cooling water pools 200, 200' in a timely manner to maintain an effective cooling function of the cooling apparatuses 1, 2 of the spent fuel pool.

According to the present invention, a cooling apparatus is provided in which, when an accident such as a power failure occurs so that the cooling apparatus cannot normally function, a cooling water can be provided to the spent fuel pool without requiring a separate power supply or an additional action by an operator so that a damage to the nuclear fuel caused when the cooling water is depleted can be prevented or delayed.

In addition, according to the present invention, a multi-purpose cooling apparatus of a spent fuel pool, which can perform a cooling function of a spent fuel pool in a normal state where a power supply is functional and can provide a cooling water to the spent fuel pool in the event of an accident such as a power failure without requiring a separate power supply, thereby preventing or delaying a release of a radioactive material.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. An apparatus for cooling a spent fuel pool, the apparatus comprising:
   the spent fuel pool containing cooling water and cooling a spent fuel stored therein;
   a cooling water pool positioned above the spent fuel pool and also containing cooling water therein;
   a heat exchanger disposed in the cooling water pool and lowering temperature of the cooling water from the spent fuel pool;
   a cooling water recovery pipe connecting the spent fuel pool and a first end of the heat exchanger and allowing the cooling water from the spent fuel pool to flow into the heat exchanger;
   a cooling water circulation pump disposed in the cooling water recovery pipe;
   a cooling water supply pipe connecting a second end of the heat exchanger and the spent fuel pool and allowing the cooling water from the heat exchanger to flow to the spent fuel pool;
   an emergency cooling water supply pipe connecting a bottom side of the cooling water pool and the spent fuel pool and supplying the cooling water in the cooling water pool to the spent fuel pool by gravity, the emergency cooling water supply pipe being separated from the cooling water supply pipe;
   a floating valve disposed in the emergency cooling water supply pipe;
   a floating device disposed in the spent fuel pool and opening and closing the floating valve according to a level of the cooling water in the spent fuel pool; and
   a transportable cooling water circulation pipe having a first end connected to the cooling water supply pipe upstream of the cooling water circulation pump and a second end connected to the spent fuel pool, the transportable cooling water circulation pipe including a transportable pump, a first valve and a transportable heat exchanger connected in series along the transportable cooling water circulation pipe between the supply pipe and the spent fuel pool.

2. The apparatus according to claim 1, further comprising:
an emergency cooling water circulation pipe connecting the cooling water pool and the spent fuel pool separately from the cooling water supply pipe and the emergency cooling water supply pipe and circulating the cooling water of the spent fuel pool and the cooling water pool.

3. The apparatus according to claim 1, wherein the cooling water pool comprises an air cooling pipe cooling the cooling water in the cooling water pool by air.

4. The apparatus according to claim 1, wherein the cooling water pool comprises a cooling water supplementing pipe supplying the cooling water from an outside of the cooling water pool into the cooling water pool.

5. The apparatus according to claim 1, further comprising:
a second valve connecting the cooling water supply pipe downstream of the cooling water circulation pump and the transportable pump.

* * * * *